C. J. REED.
PROCESS OF OBTAINING MANGANESE DIOXIDE AND NITRIC ACID.
APPLICATION FILED JULY 27, 1921.
1,415,395.  
Patented May 9, 1922.
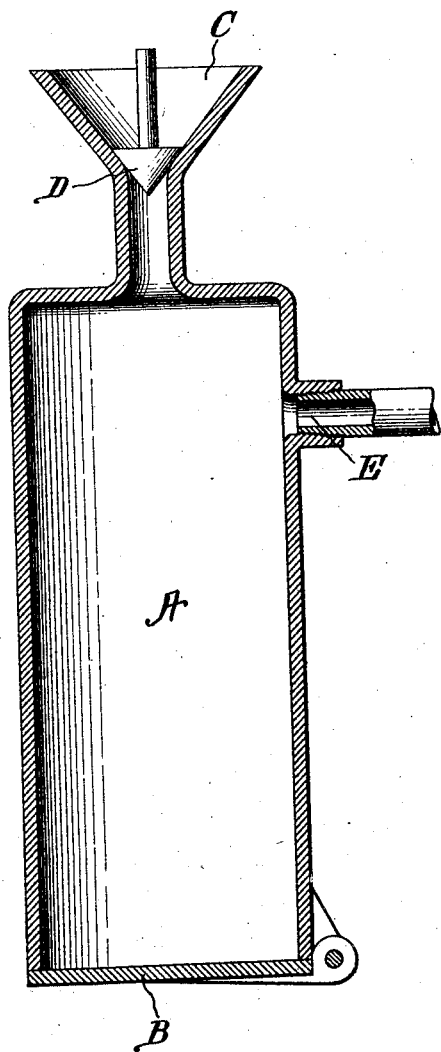

UNITED STATES PATENT OFFICE.

CHARLES J. REED, OF HOMESTEAD, CALIFORNIA, ASSIGNOR OF ONE-HALF TO JAMES G. BERRYHILL, OF SAN FRANCISCO, CALIFORNIA.

PROCESS OF OBTAINING MANGANESE DIOXIDE AND NITRIC ACID.

1,415,395.        Specification of Letters Patent.        Patented May 9, 1922.

Application filed July 27, 1921. Serial No. 487,999.

*To all whom it may concern:*

Be it known that I, CHARLES J. REED, a citizen of the United States, residing at Homestead, in the county of San Mateo and State of California, have invented certain new and useful Improvements in Processes of Obtaining Manganese Dioxide and Nitric Acid, of which the following is a specification.

This invention relates to the manufacture of manganese dioxide the principal object of the invention being a simple and relatively inexpensive process of forming the dioxide. The principal features and advantages of the process reside in the use of inexpensive reagents, the simplicity of the reaction and ease with which it is carried out, the production of a reaction mixture from which relatively pure manganese dioxide is easily separated, and the recovery of valuable by-products.

Broadly, the process consists in heating a mixture of manganese sulfate with a metal nitrate to reacting temperature, expelling the volatile products and recovering manganese dioxide from the solid reaction products.

Practically all of the metal nitrates are available for use in my process. The selection of the nitrate of a particular metal may be indicated by a demand for the sulfate of that metal which may be produced as a by-product. The nitrates of sodium, potassium, lithium, calcium, barium, strontium, magnesium, zinc, cadmium, and copper, may be used with satisfactory results. It is to be understood however that the process is not limited to the use of the metal nitrates named since it is apparent that other metal nitrates or mixtures of metal nitrates may be employed.

Sodium nitrate, on account of its cheapness and fusibility, is preferred where the production of manganese dioxide is the principal object of the process and the formation of a particular metal sulfate other than sodium sulfate is not desired.

The manganese sulfate employed may be any hydrated mixture containing at least one molecule of water, manganese sulfate containing two or more molecules of water of crystallization being preferred.

The reagents, that is, the metal nitrate and the manganese sulfate are caused to react by heating in any suitable manner. The reagents may, for instance, be mixed, and heated to a temperature sufficient to cause the reaction forming manganese dioxide and expelling volatile products, such as nitric acid and oxides of nitrogen to take place, or the metal nitrate may be heated and fused and the manganese sulfate added.

The proportions of manganese sulfate and metal nitrate employed in the reaction may vary within a considerable range.

The metal of the metal nitric should be present in quantity just sufficient to combine with the sulfate radical of the manganese sulfate. The use of an excess of either the manganese sulfate or the metal nitrate does not materially hinder the reaction but results in the loss of the excess of reagent as well as the pollution of the metal sulfate produced by the reaction.

Apparatus suitable for carrying out the process is illustrated in the accompanying drawing.

Referring to the drawing the apparatus comprises a receptacle or chamber A, made of iron or other material not acted upon by the materials used or produced. The receptacle is provided at its lower end with a hinged closure B and at its upper end with a feed hopper or funnel C normally closed by the removable cone or stopper D. At or near the upper end of the receptacle is an outlet E which may be connected with a condenser of other suitable means (not shown) for the recovery of the gaseous products of the reaction. The receptacle A may be mounted in any suitable setting and provided with means for heating it as will be readily understood.

The preferred method for carying out the process when sodium nitrate is the metal nitrate employed, is to melt the sodium nitrate and then add the manganese sulfate.

The receptacle A is charged with sodium nitrate through the funnel C and is heated until the nitrate is fused. Manganese sulfate containing two or more molecules of water of crystallization is then added and the funnel closed. During the heating, steam, nitric acid and oxides of nitrogen pass off through the outlet pipe E and are treated for the recovery of nitric acid which forms a valuable by-product of the process. When the reaction is complete which condition is indicated when the evolution of gaseous products substantially stops, the hinged closure B is opened and the solid products of the reaction comprising manganese dioxide and sodium sulfate are discharged from the receptacle. The mass of sodium sulfate and manganese dioxide after cooling is broken up and leached with water. The sodium sulfate dissolves leaving pure manganese dioxide which is separated from the aqueous mixture, washed and dried.

I claim:—

1. The process of making manganese dioxide and nitric acid which consists in heating to a reacting temperature a mixture of manganese sulphate containing water with a metallic nitrate and thereby volatilizing nitric acid and leaving a residue containing manganese dioxide.

2. The process of obtaining manganese dioxide and nitric acid which consists in heating to a reacting temperature a mixture of manganese sulphate containing water with the nitrate of a metal forming a soluble sulphate and thereby eliminating gaseous nitric acid, leaving a residue of manganese dioxide and a soluble metallic sulphate and removing the soluble sulphate with water.

3. The process of obtaining manganese dioxide and nitric acid, which consists in heating to a reacting temperature manganese sulphate containing water with sodium nitrate and thereby eliminating nitric acid and leaving a residue of sodium sulphate and manganese dioxide and subsequently separating the sodium sulphate from the manganese dioxide by solution in water.

4. Process of making manganese dioxide and nitric acid which comprises heating a mixture of manganese sulfate containing two or more molecules of water of crystallization and a metal nitric to reacting temperature, recovering nitric acid from the gaseous products of the reaction, and recovering manganese dioxide from the solid reaction product.

In testimony whereof, I affix my signature.

CHARLES J. REED.